Fig. 1.

INVENTORS.
ELSNER C. LUNDHOLM
HARRY L. LUNDHOLM
BY
Parker and Carter
ATTORNEYS.

Fig.5.

United States Patent Office 2,969,880
Patented Jan. 31, 1961

2,969,880
FILTER

Elsner C. Lundholm, 1535 10th St., and Harry L. Lundholm, 1908 Colorado Ave., both of Rockford, Ill.

Filed June 25, 1958, Ser. No. 744,441

7 Claims. (Cl. 210—393)

This invention is in the field of filtering or separating and is concerned specifically with cleaning or filtering liquid coolants used with machine tools, grinders and the like. While specific reference is made to coolants, many of the inventive aspects may be applied or used in filtering or cleaning other liquids, and the disclosure should be so interpreted.

In filtering coolants it is desirable to filter on a continuous basis. Any coolant filter, in addition to operating continuously, should separate according to a certain desired micron finish, which will be determined in accordance with the use of the coolant. For example, the coolant might be used with a turret lathe, milling machine, grinder, etc. A typical example of a desired micron finish might be ten microns. This is only given, however, as an example.

A serious problem with coolant filters is clogging, and it is very desirable to keep the screening or filtering device clear and at the same time to provide a constant micron finish. Also, the coolant should be aerated to retard bacteria growth and other harmful products.

A primary object of the invention is a coolant filter which will provide a constant micro inch separation on a continuous basis.

Another object is a coolant filter which will aerate the coolant.

Another object is a coolant filter having a somewhat cylindrical screen drum with screens that may be quickly and easily changed.

Another object is a coolant filter with a continuous drag-out chain.

Another object is a novel backwash in a filter of the above type.

Another object is a controlled backwash in a coolant filter which insures continuous operation.

Another object is a coolant filter with a backwash feature which may be visually inspected.

Another object is a coolant filter which does not require a standby unit.

Another object is a coolant filter which prevents direct flow of dirty coolant from the inlet through the screening medium to the outlet for clean coolant.

Another object is a cyclical backwash or counterflow through a coolant screen with maximum efficiency.

Another object is a coolant filter which requires a minimum of supervision and thereby reduces the number of expensive personnel required.

Another object is a coolant filter which operates on a pressure differential basis.

Another object is a combination filter and drag-out conveyor.

Another object is a coolant filter which requires a minimum of maintenance.

Other objects will appear from time to time in the ensuing specification and drawings in which.

Figure 1:
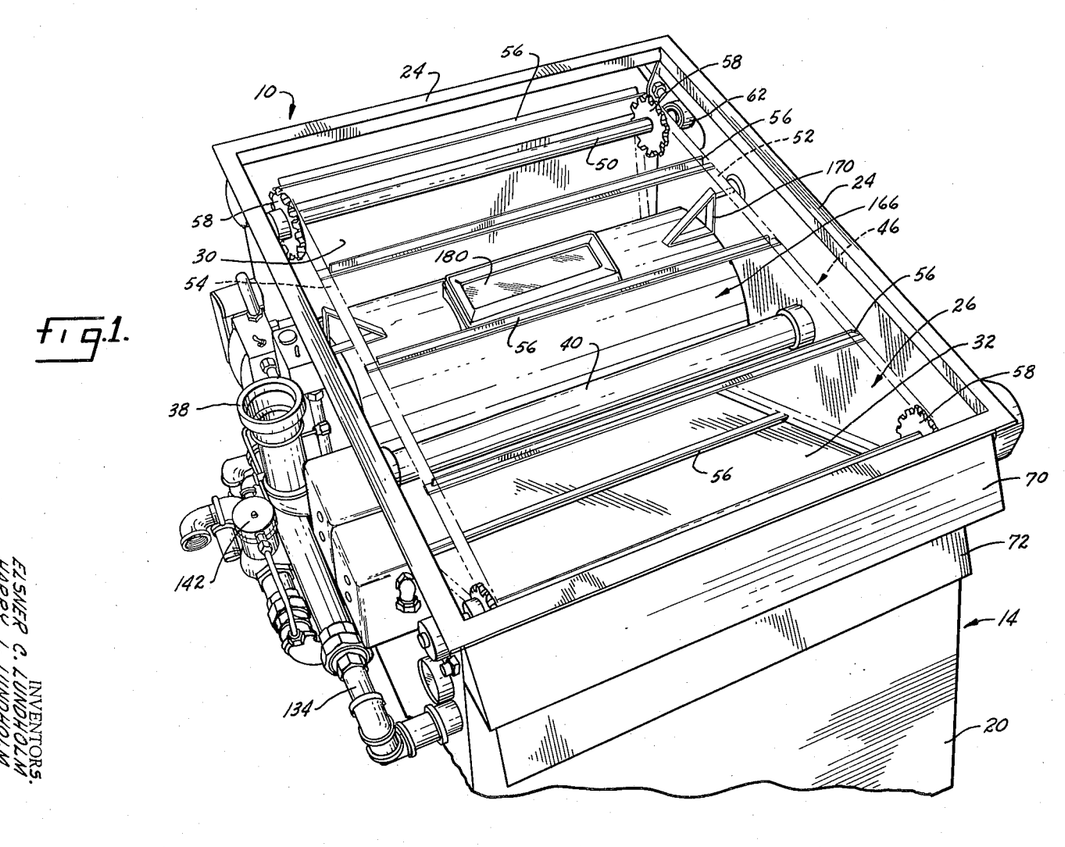
Figure 1 is a perspective of the coolant filter.
Figure 2:
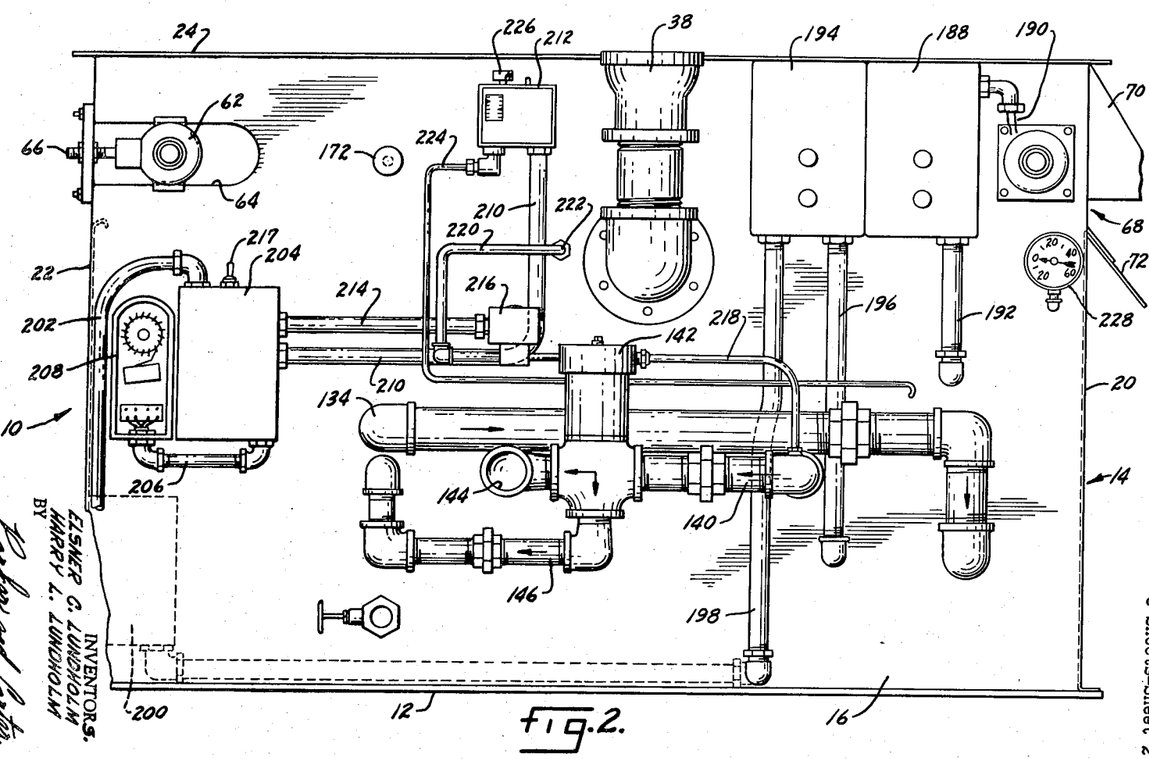
Figure 2 is a side view of the unit in Figure 1.
Figure 3:
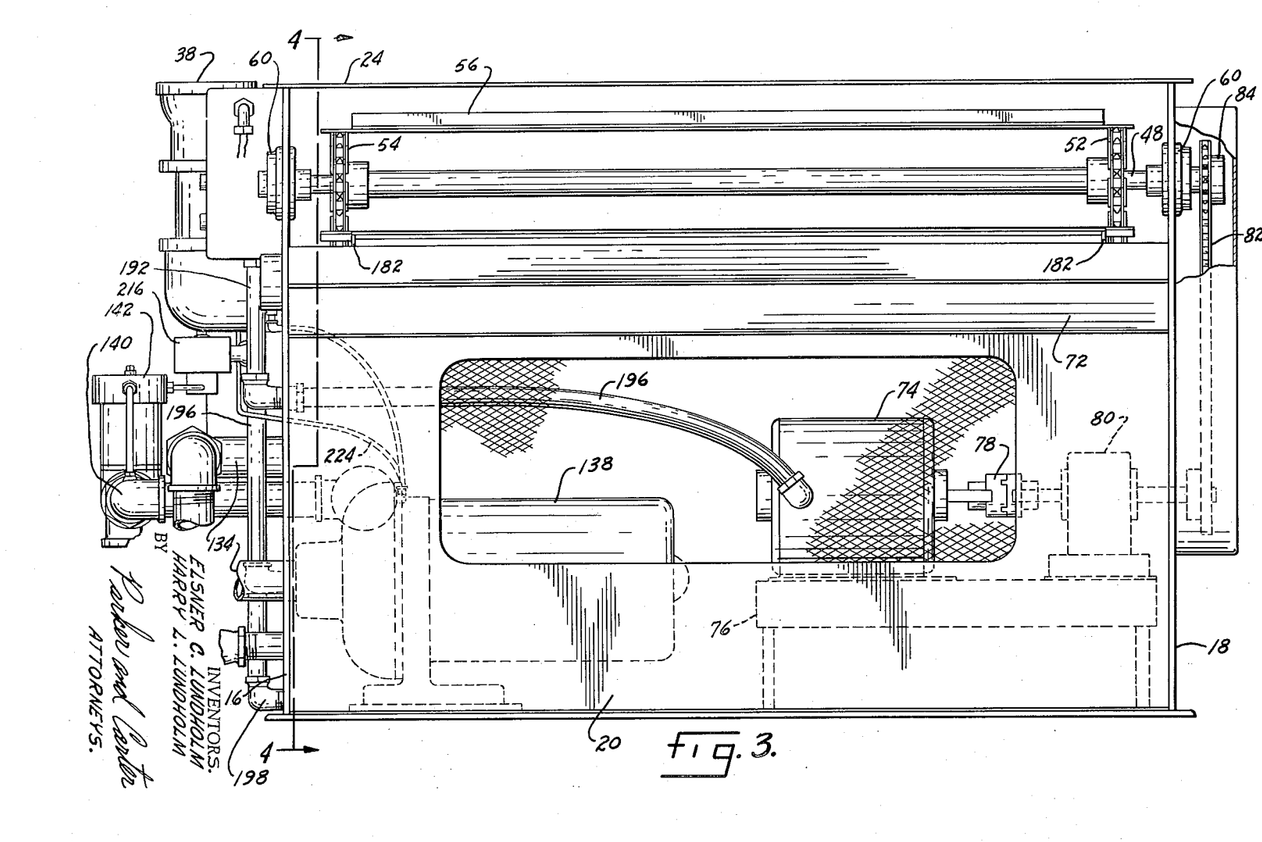
Figure 3 is a front view of Figure 2.

In Figures 1, 2 and 3 the coolant filter has been indicated generally at 10 and includes a base 12 or the like which supports a generally upright frame 14, which is shown generally in a boxlike formation. The frame, as shown in Figures 2 and 3, has left and right side walls 16 and 18, and front and rear walls 20 and 22, all with an upper outstanding flange 24 or the like. A tank or the like, designated generally 26, in Figure 1, is defined by a trough or lower wall 28 in Figure 4, which has two outwardly extending generally straight legs 30 and 32 and an arcuate or curved portion 34 at the bottom, the leg 30 being more steep than the leg 32, both the legs being inclined to the end or front and rear walls.

The normal fluid or coolant level is indicated generally at 36. Coolant to be filtered is returned by a gravity feed or otherwise to an inlet pipe 38 in Figures 1 and 2 which is shown as connected through the left wall 16 to a distributor header 40 extending across the tank in Figure 4. However, the inlet 38 might be a trough or cup and the connection could be made through the right wall 18. It should be noted that the header is disposed approximately at the liquid level 36. A plurality of downwardly directed jets or openings 42 are provided through the bottom of the header so that the inlet liquid, which is under pressure, will be ejected downwardly into the tank generally toward the inclined leg 32 of the trough.

Figure 4:
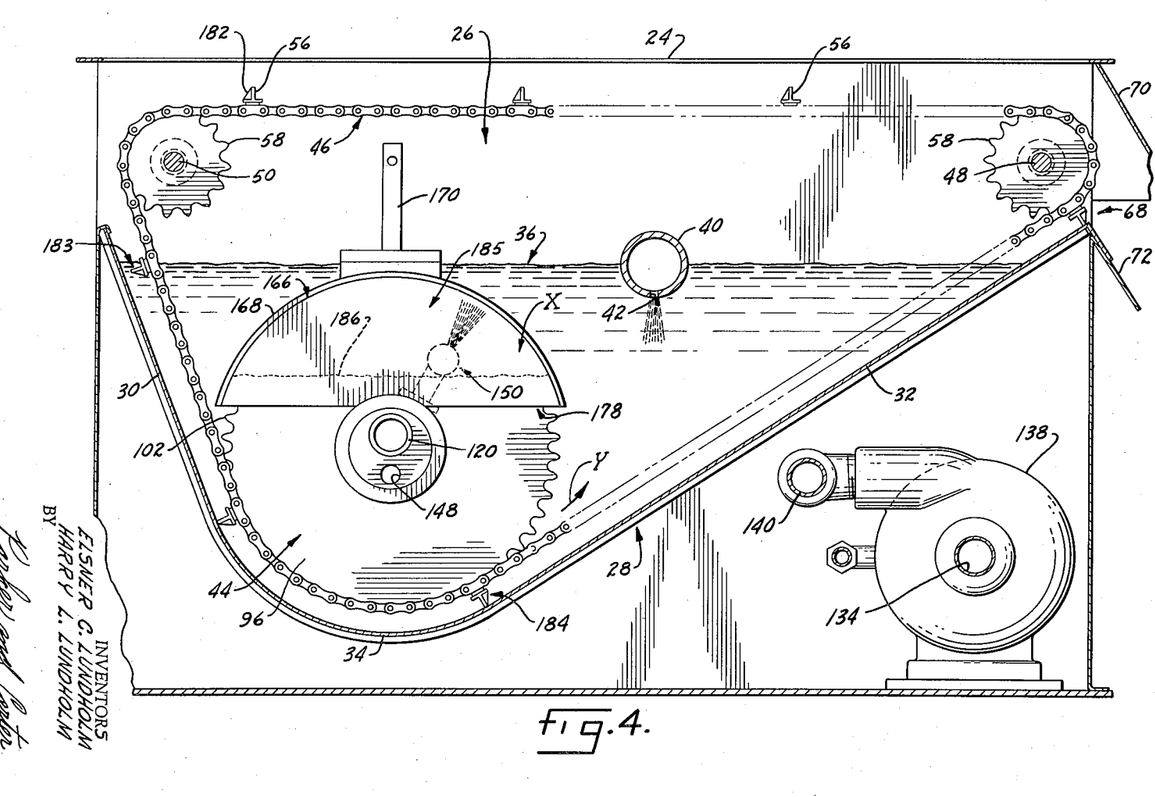
Figure 4 is a section along line 4—4 of Figure 3.

A screen drum or screening medium or filter in the form of a cylindrical drum or the like 44 in Figure 4 is mounted in the bottom of the trough or tank and conforms generally to the arcuate portion 34 of the trough. As will be explained in detail hereinafter, the drum is rotatably mounted and coolant from the tank passes through it to a clean coolant outlet which is in communication with the inside of the drum. Since the ends of the drum are sealed, the coolant must pass through the filtering medium on its way to the outlet.

A drag-out chain, designated generally 46, passes around the bottom of the drum and also around two drive shafts, one at 48 at the front or head end and the other at 50 at the rear or tail end. The chain is continuous and may include two side chains 52 and 54 interconnected laterally by T bars 56 or the like. A plurality of such bars interconnect the side chains and are generally equally spaced. Each such bar, as shown in Figure 4, may be generally T-shaped with the vertical leg of the T extending outwardly or away from the filter cylinder or drum. The front and rear shafts 48 and 50 may have sprockets 58 or the like which engage the side chains to constitute a positive drive. The front shaft may be mounted in suitable bearings 60 which, as shown, may be fixed in the side walls 16 and 18. The rear shaft 50 may have its bearings 62 mounted in longitudinal slots 64 in the side walls 16 and 18, as shown in Figure 2, and a suitable adjusting mechanism 66 may be provided so that by adjusting the position of the shaft 50, the tension in the chain may be varied.

The rear panel or wall 22 may be closed, but an outlet or discharge 68 with a guard 70 and discharge lip 72 may be provided in the front wall so that material removed from the coolant may be discharged from the bath or tank. It should be noted that the chain or drag-out moves in a generally counterclockwise direction in Figure 4. The bars 56 on the chain smoothly and evenly engage the inclined portion 30 of the baffle, move under the filter cylinder 44 and then up the inclined leg 32 of the baffle to the discharge 68. The diameter of the sprockets 58 on the front shaft and the location of the shaft relative to the discharge 68 is such that the bars 56, after scraping and conveying the material up the inclined leg 32, will discharge it onto the lip 72. A suitable container or conveyor may be located below the lip 72 so that the discharge material may be collected and removed.

Behind the front wall 20, we may provide a suitable drive motor 74 in Figure 3 which may be mounted on a suitable platform 76 or the like and, through a suitable flexible coupling 78 and speed reducer 80, may drive a suitable chain 82 which passes around the sprocket 84 on one end of the front shaft 48, as shown in Figure 3. As shown in Figure 1 the front wall may have a suitable grill for ventilation.

Figure 6:
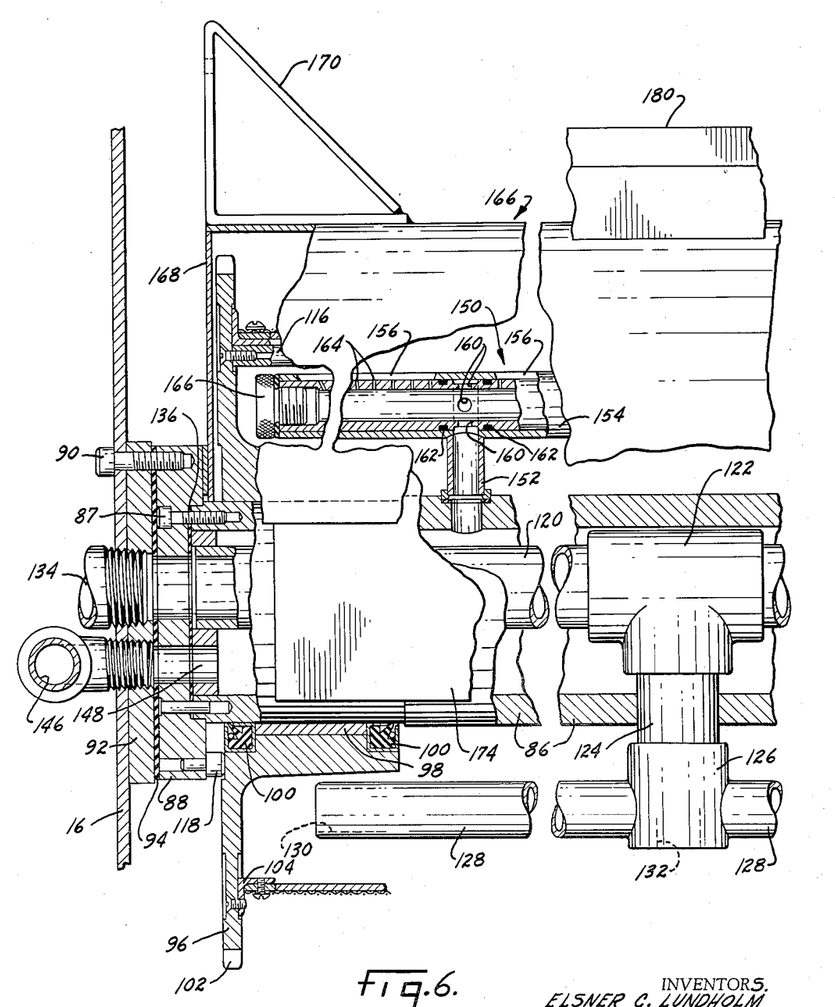
Figure 6 is a section generally along line 6—6 of Figure 5 with parts broken away.

The screen, cylinder or drum is rotatably mounted on a sleeve or tube 86, as shown in Figure 6, which in this case is a manifold tube. The tube is connected by bolts or the like 87 to a suitable plate 88 which may be connected by suitable bolts or otherwise 90 to the housing or frame. The bolts 90 draw the plate 88 toward a second plate 92 which may be welded or otherwise secured to the inside of wall 16 and a suitable gasket or seal 94 may be provided to prevent leakage.

Suitable wheels or hubs 96 may be mounted on each side of the manifold tube 86 on a bearing 98 or the like. Each end of the bearing may have suitable oil seals 100 and the outer edge of the flange or wheel 96 may be provided with sprocket teeth 102 which engage with side chains 52 and 54 of the drag-out chain.

Figure 5:
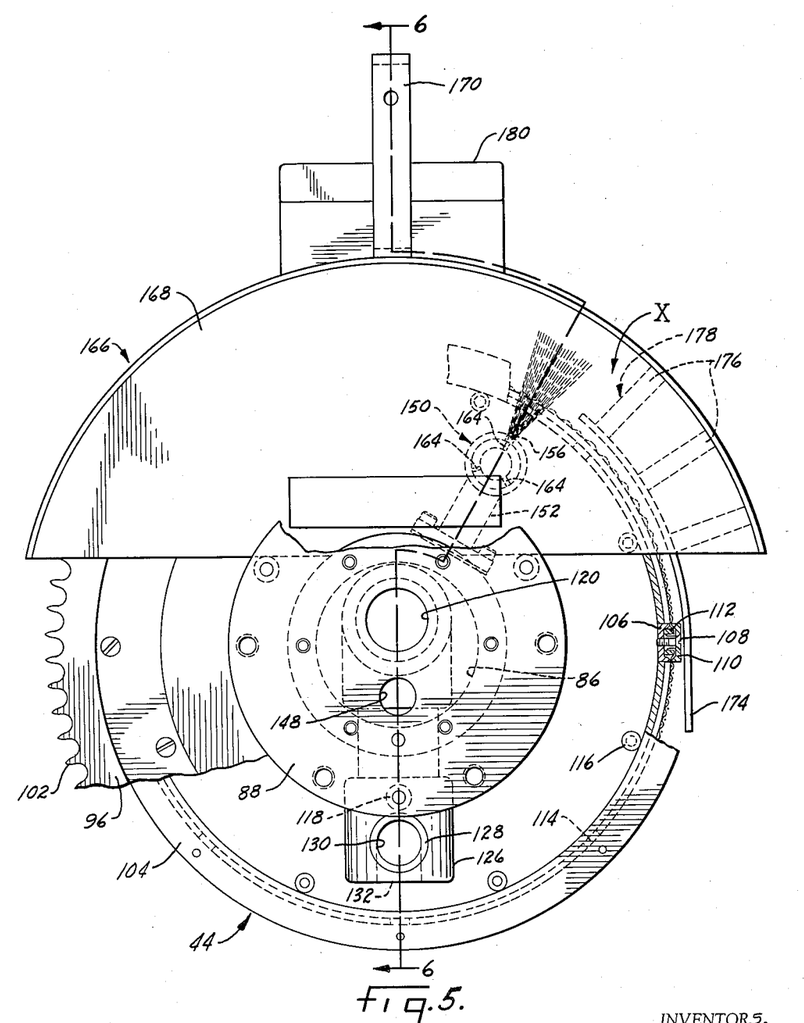
Figure 5 is a side view, on an enlarged scale with parts both broken away and in section, of the filter or screen drum and air hood.

The inside of the wheels 96 may be provided with suitable flanged rings 104 which serve as a mounting for the screen cage. As shown in Figure 5 the screen itself may be formed in two sections, each 180 degrees, with their ends anchored on cross bars 106. Screws 108 or otherwise may be used to pull a cross channel or the like 110 down against the ends of the two screen sections, each of which may be wrapped around or partially wrapped around a strip 112 or the like. Suitable cross members 114 may be provided circumferentially at suitable intervals around the drum to support the screen. A plurality of spacer rods 116 may be provided around the inside of the cylindrical screen to establish the position between the wheels or sprockets 96, and also to tie the two sprockets or wheels together. The position of the drum may be determined by spacing or wear buttons 118 in Figures 4 and 5.

It will thus be seen that the filter drum or screen rotates with the drag-out chain and the drum is rotatably supported on the manifold tube 86. In Figure 5 a suction or discharge pipe 120 may be disposed inside of the manifold tube and may have a T joint 122 and extension 124 extending through the wall of the tube connected to a suction manifold 126 which may have arms 128 extending in opposite directions inside of the screen drum. Suitable inlets 130 may be provided at the ends of the arms and an inlet 132 may be provided in the middle of the suction manifold. Thus, coolant which is passed through the screen will be drawn in by the manifold 126, conveyed through the manifold tube to the suction pipe 120 and then discharged through a suitable outlet pipe, designated 134. The connection between the suction pipe 120 and the discharge pipe 134 may be suitably sealed, as at 136.

It will be noted in Figure 2 that the discharge pipe 134 passes through the left wall 16 and is connected to a suitable pump 138 which may be electrically driven. The pump discharges through a pipe 140, in Figures 1 and 2, to a three-way valve 142 or the like and then to an outlet or discharge 144 for return to the machine tool or grinder or wherever the coolant is used. The valve 142 operates to supply all of the coolant to the discharge 144 returning to the point of use or to bypass a portion of the coolant, say, for example 15%, through a bypass 146. The bypassed portion will be referred to as backwash and it will be noted in Figures 5 and 6 that the bypass pipe 146 is connected to a suitable passage 148 in the sealed manifold tube or support 86. The passage 148 communicates with the interior of the manifold tube so that the backwash, which is clean coolant, flows into the manifold tube around but outside of the suction pipe 120. The pump 138 causes the backwash to be at a substantial pressure.

A spray header 150 is mounted on the manifold tube 86, as shown in Figures 5 and 6, and may be connected to the manifold tube by a plurality of suitable pipes 152 or the like. The spray header may be made up of two pipes, first an outer pipe 154 which has an elongated slot or the like 156 along its outer edge, and an inner or selector pipe 158 which may be rotatably mounted in the outer pipe. Fluid from the tube 152 passes through suitable openings 160 in the inner pipe, both sides of which are sealed as at 162 to prevent leakage. The inner or selector pipe 158 is shown with three longitudinal rows of jets or openings 164, but there might be more or less. The size of the openings may vary from one row to another. Knurled sealing plugs 166 may be provided in the ends of the header and the inner pipe 158 may be rotated to bring any row of openings 164 into alignment with the elongated slot 156 in the outer pipe. But regardless of which row of openings 164 is aligned with the slot 156, the backwash or spray header will provide an elongated spray or jet of clean fluid or coolant against the inner surface of the screening medium. It will be noted in Figure 5 that the spray header 150 is disposed at approximately 30 degrees from the vertical near the top of the drum, while the suction header 128 is in the bottom of the drum. While we have only shown one spray header, another might be used, for example, it might be disposed approximately 30 degrees on the other side of the vertical in Figure 5. Depending upon the particular coolant that is being cleaned and filtered and the particular use for the coolant, the spray header 150 may be preliminarily adjusted to regulate the intensity or type of backwash spray to effect the most efficient cleaning of the screen drum.

In certain applications the selector or inner pipe 158 might be dispensed with. In this case only the outer tube 154 would be provided and it might have a plurality of holes of any given size. But we prefer the selector arrangement shown in Figure 6.

It will be noted in Figure 4 that we provide an air hood 166 which, as shown, may be arcuate and disposed below the normal liquid level 36. The hood may have side plates 168 which, when the hood is mounted in place, are disposed on both sides of the screen drum. Hold down brackets 170 may be disposed on each side of the hood and the hood may be supported by suitable screws or bolts or the like 172 which extend through the side wall of the frame and into the brackets 170. The hood is airtight and may be provided with an inner baffle 174 which extends all the way across and a substantial distance below the hood, as shown in Figure 5, and also a substantial distance up into the hood, being held therein by suitable spacers or the like 176. Thus, a discharge passage, as at 178, is provided between the hood and baffle. The hood may have a suitable transparent sight glass 180 or the like, the use of which will be set forth hereinafter.

The T-shaped channels 56 in the drag-out chain may have end plates or closures 182. When the chain passes over the rear sprockets and shaft 50 and starts down into the tank, the construction of the cross bars 56 and the angle of descent of the chain is such that when the bars enter the liquid, air will be trapped under the troughlike formation of the bars. Note the position of the bar at 183 in Figure 4. When the bars pass under the drum, they will be tilted so that the air will escape and will rise through or around the screen drum up under the hood 166. Note the position of the bar at 184 in Figure 4. But the hood is airtight and accordingly an air pocket 185 will be formed under the hood. The liquid will eventually establish itself at a level 186. It should be noted that the backwash header 150 is above the level of the liquid 186 under the hood. Thus, the spray or jet from the backwash header will be entirely within the air space or pocket under the baffle or hood. The importance of this is that if the header 150 was submerged, the liquid around it would resist the jet action. But by having the jet in the air pocket, the jet will encounter less resistance and a greatly increased cleaning action of the clean backwash coolant spraying in a counterflow direction through the screening medium will be acquired. It should be noted that the jet action or cleaning spray, which takes place in the air pocket, will clean the entire screening medium since the drum or cylinder is rotating.

It should also be noted in Figure 4 that the spray is directed generally toward the area X under the hood which is at the entrance to the discharge passage 178 between the inner baffle 174 and the hood. After the spray passes through the screening medium, it will flow down the discharge 178 and will be prevented from returning directly to the screening cylinder by the elongated skirt portion 174 on the inner baffle. It will also be noted that the direction of rotation of the screen cylinder or drum is such, in relation to the disposition or location of the other parts, that a flow of coolant will tend to be set up from the leg 32 of the baffle, across the top of the air hood, toward the leg 30 of the baffle. In effect, this coolant current is counterclockwise in Figure 4. In a sense, the action of the drum and the drag-out chain with its cross bars is such as to create a slight pumping action causing the liquid to rise slightly, as indicated by the arrows Y under the discharge from the hood at 178. Thus, the filtered material which flows down the discharge passage 178 along the skirt 174 from the air hood will be met by the rising current Y and will tend to move up along leg 32 away from the drum toward the discharge by the drag-out chain.

The left wall 16 may support various electrical connections for the drives and the like. For example, in Figure 2 a control box or panel 188 may be connected to a suitable power source through leads 190 and to the motor 74 through suitable leads in a conduit 192. This might be 440 volt current or otherwise. A second control panel 194 may be connected to the same power source 190 so as to receive 440 current. The two boxes may have conventional magnetic starters. Leads from the box 194 may be taken to the pump 138 by a suitable conduit 196. Leads in a conduit 198 may be taken from a control box 194 to a transformer 200 which steps the current down from, say, 440 volts to 110 volts, and the lower voltage current may be carried through leads in a conduit 202 to a junction box 204. From the junction box leads may run through a conduit 206 to a timer 208, through a conduit 210 to a controller 212, and through a conduit 214 to a solenoid valve 216. A switch 217 may be provided on the junction box 204 so that the timer 208 may be cut out entirely, if desired. A pipe 218 may supply relatively high pressure clean coolant from the discharge pipe 140 to the top of the valve 142 and a suitable discharge pipe 220 extends from the valve 142, is controlled by the solenoid pilot valve 216, and empties into the tank at 222. The details of the valve 142 have not been shown; however, it should be understood that it may be a conventional valve in which the areas, pressures and springs are arranged so that when the solenoid valve 216 is closed, thereby closing the discharge 220, the pressure in the pipe 218 is such, in relation to the other mechanism of valve 142, as to hold the valve closed, thereby closing the bypass 146. But when the solenoid valve 216 opens the discharge line 220, the pump pressure on top of the valve 142 will be relieved and the valve 142 will open the bypass 146. The point is that the combination of the valve 142 and the solenoid valve 216 is such that the bypass may be selectively opened and closed so that clean coolant will be supplied to the backwash header through pipe 146.

The controller 212 responds to the discharge pressure of the pump 138 which is communicated to it through a pipe 224 of any suitable type. The controller may be adjusted at 226 to respond to different pressures. When the pressure inlet to the pump falls, the discharge pressure will fall. This pressure drop is caused by clogging of the screening cylinder or drum. Note that the pump draws liquid through the screen. This pressure drop will cause the controller 212 to open the solenoid valve 216, thereby opening the bypass 146. A backwash will be supplied to the header 150 until there is a pressure rise in the pump discharge and the screen will be cleaned automatically.

The same is true of the timer 208. We may set the timer so that on a regular cyclical basis, the valve 142 will open the bypass providing a backwash to the header 150, thereby cleaning the screen.

We might use a vane pump or any suitable type of pump to supply air to maintain the level, however, the arrangement described involving the drag-out chain is satisfactory.

It should be noted that the level under the hood may be naturally maintained by the drag-out chain. The level may vary somewhat but we prefer that it always be below the backwash header 150. Air will be absorbed from under the hood by aeration or absorption into the coolant, and it may flow out from under the edges of the hood.

In Figure 6 we have shown the intake inside of the filter or screening drum in the form of a manifold 120 in the sleeve or tube 86 with the backwash being supplied to the tube 86. However, this could be reversed. The backwash could be manifolded in tube 86 and the inlet could be connected directly to the inside of the tube 86. With this arrangement, we might connect the backwash line 146 to the opposite side so that we could use a larger suction line 134. In short, either the inlet 120 or the backwash could be manifolded and the inlet could discharge through one side and the backwash admitted through the other.

Whereas we have only shown and described the introduction of air under the hood, in certain situations we might introduce sealed tubes in limited amounts, either on an intermittent basis or continuously, to retard bacteria growth. The pressures and quantities involved are unimportant. But, in normal applications, it is only necessary to introduce air.

The use, operation and function of the invention are as follows:

We provide a coolant filter which may be used with either ferrous or non-ferrous metals. The coolant to be cleaned may be supplied or returned by gravity through the inlet 38. The distributor header 40 sets up a rather violent agitation, thereby aerating the liquid to retard bacteria growth. The header 40 is within the confines of the continuous drag-out chain. The pump 138 draws the dirty liquid through the rotating screening medium. The screening medium itself is cleaned by the backwash. The backwash and hood cause the material to fall toward the drag-out chain rising up the leg 32 of the trough and the material will be discharged through the opening 68.

The air pocket under the air hood is particularly effective in assisting the spraying of clean backwash coolant to clean the filter medium or screening drum. It should be noted that it is the drag-out chain itself which supplies air to the pocket under the hood. The adjustment 66 of the rear sprockets is such that the chain approaches the leg 30 of the trough on a smooth tangential basis. The cross bars 56 may be made of rubber or metal, but rubber is preferable since there is a scraping action up the leg 32 of the trough.

The timer 208 may be used to cyclically supply backwash to the header 150. For example, we might run on a cycle with a 2½ minute period with 1 minute of backwash every period. But this is merely an example and it might be otherwise. When using the timer, the pressure control with controller 212 should also be used as an overriding safety. In certain instances, the pressure control 212 might be used alone.

It should also be understood that the backwash may be supplied on a continuous basis so that at all times a certain percentage, for example 15%, of the cleaned coolant in discharge pipe 140 will be bypassed through the pipe 146 as a backwash. In this case it might be desirable to use the pressure controller 212 as an overriding safety which, in the event of a drop in pressure, will cause additional coolant to be bypassed to the backwash header to thoroughly clean the screen thereby removing the restriction to the pump.

The unit has the advantage that the drag-out chain and screening drum or medium are driven in unison. The backwash and drive may be coordinated to provide a constant micron finish separation at all times. The backwash may be easily inspected through the window 180 in the top of the air hood. It should be noted that the window may rise above the normal liquid level 36 in the tank, but the air hood is substantially or entirely submerged. We provide very effective aeration and agitation of the coolant mass before it passes through the screening drum.

The drum itself has the advantage that the two screening sections, or how many are used, may be quickly and easily changed in the event of excessive wear or damage. The particular mesh used may be varied and the invention is not restricted to any particular size or mesh.

It should be particularly noted that the unit may be operated on a continuous basis and the micron finish separation may be constant. There is no need for a standby unit which is to be used when the main unit clogs or binds. Accordingly, there is no down time, except what might be required for annual maintenance. Additionally, a single pump circulates coolant through the system.

It is also important to note that the pump merely draws coolant from inside the filter drum or cylinder. In reality, it is atmospheric pressure that forces coolant through the screen. Therefore, the screening mesh cannot be damaged by excessive pressure which might be built-up by a pump which forced coolant through the medium. In a sense, the filtering is by vacuum.

It should also be noted that the agitation and aeration which is created by the jets from the inlet or distribution manifold 40 do not interfere with filtering. The material removed from the coolant may be referred to as swarf, and it should be noted that the settled swarf is continuously discharged so that concentration of the swarf in the tank is avoided. Additionally, the drag-out serves to aerate the coolant and establishes a fixed relationship between the rotation of the screening medium and the discharge by the drag-out chain.

It is important that agitation of the liquid be localized adjacent the point where the dirty or unfiltered liquid reaches the bath. The bath itself is generally quiescent and it is especially quiescent adjacent and immediately surrounding the screen drum. Also, the drum is rotated at a peripheral speed, for example 4 feet per minute, more or less, such that a fanning action will not take place and the liquid will still pass inwardly through it. Also, the swarf washed from the screen drum is free to settle toward the bottom of the tank since the solids are heavier than the liquid. The conveyor bars will scrape the swarf up to the discharge.

The mounting of the manifold tube 86 on the right wall 18 may be much the same as the left wall connection shown in Figure 6 except the sealed passages are not needed.

While we have shown and described the preferred form and suggested several variations of our invention, it should be understood that suitable additional modifications, changes, substitutions and alterations may be made without departing from the invention's fundamental theme. More than one wash or flushing or spray header for backwash may be used. The drum need not necessarily be perfectly cylindrical, and it might be otherwise. We might also form the legs or all of the trough 28 as or in contact with refrigerant evaporator plates to cool the fluid while it is cleaned. A pressure gauge 228 may be used to visually indicate the discharge pressure of the pump 138, if desired. The drag-out chain might vary somewhat as long as the same function or operation takes place. With these and other modifications in mind, we wish that the invention be unrestricted except as by the appended claims.

We claim:

1. In a filter for coolant and the like, a tank adapted to hold coolant, an inlet for supplying coolant to be filtered to the tank, a continuous filter medium in the tank below the normal coolant level adapted to be moved through a continuous path, power means for moving the filter medium through its path, an outlet in communication with the inside of the filter medium for discharging filtered coolant, an air impervious hood over at least a part of the filter medium below the normal coolant level, means for supplying air to the hood to form an air pocket thereunder with a separate coolant level through which at least a part of the filter medium path extends, and means for providing a counterflow of coolant through the filter medium as it passes through the air pocket under the hood.

2. The structure of claim 1 further characterized by and including a continuous drag-out chain around and in engagement with the filter medium and extending from it, the chain including a plurality of laterally disposed longitudinally spaced bars, air retaining portions on the bars, the chain being constructed to move through a closed path a portion of which is above the normal coolant level so that the air retaining portions will pick up air and carry it down under the hood.

3. The structure of claim 1 further characterized by and including a continuous chain in the tank adapted to move through a closed path a portion of which is above the normal coolant level and another portion is under the hood, and air retaining portions on the chain constructed to take air from above the normal coolant level down under the hood.

4. The structure of claim 3 further characterized in that the filter medium is in the form of a screen drum with closed ends and is mounted to be rotated, the chain being in engagement with the drum to rotate it.

5. The structure of claim 1 further characterized by and including an inner baffle laterally disposed in the hood on one side extending substantially below the lower edge of the hood, the upper edge of the baffle being in the air pocket under the hood but spaced down somewhat from the top of the hood, the baffle being spaced inwardly from the inner surface of the hood to define a discharge passage with the hood, the coolant counterflow means and inner baffle being disposed so that the counterflow of coolant through the filter, and the foreign matter picked up from the filter by the counterflow, will be discharged through the discharge passage defined between the inner baffle and the hood.

6. In a filter for coolant and the like, a tank adapted to hold a supply of coolant, an inlet for supplying coolant to be filtered to the tank, a continuous filter medium in the tank below the normal coolant level adapted to be moved through a continuous closed path, power means for moving the filter medium through such path, an outlet in communication with the inside of the filter medium for discharging filtered coolant, an air tight hood over at least a part of the filter medium disposed below the normal coolant level, and means for establishing an air pocket under the hood through which a part of the filter medium path extends, including a continuous drag-out chain around and in engagement with a substantial portion of the filter medium, the chain having a plurality of air retaining portions with a section of the chain extending above the normal coolant level, the chain being constructed so that the air retaining portions will pick up air when above the normal coolant level and will carry it down under the hood.

7. The structure of claim 6 further characterized by and including means for providing a counterflow of filtered coolant through the filter medium at a point in the air pocket under the hood so that counterflow is directed through air and not through coolant.

References Cited in the file of this patent

UNITED STATES PATENTS

| | | |
|---|---|---|
| 870,138 | Stump et al. | Nov. 5, 1907 |
| 2,267,086 | Donohue | Dec. 23, 1941 |
| 2,351,712 | Sattele et al. | June 20, 1944 |

FOREIGN PATENTS

| | | |
|---|---|---|
| 382,942 | Germany | Oct. 8, 1932 |